US006571560B2

(12) United States Patent
Tatsumi et al.

(10) Patent No.: US 6,571,560 B2
(45) Date of Patent: Jun. 3, 2003

(54) CERAMIC MEMBER SUPPORT STRUCTURE FOR GAS TURBINE

(75) Inventors: Tetsuo Tatsumi, Kobe (JP); Yoshihiro Ichikawa, Kobe (JP)

(73) Assignee: Kawasaki Jukogyo Kabushiki Kaisha, Hyogo-Ken (JP)

( * ) Notice: Subject to any disclaimer, the term of this patent is extended or adjusted under 35 U.S.C. 154(b) by 0 days.

(21) Appl. No.: 09/832,975

(22) Filed: Apr. 12, 2001

(65) Prior Publication Data

US 2001/0032453 A1 Oct. 25, 2001

(30) Foreign Application Priority Data

Apr. 21, 2000 (JP) ....................................... 2000-120521

(51) Int. Cl.[7] .................................................. F02C 7/20
(52) U.S. Cl. ............................................ 60/753; 60/800
(58) Field of Search .......................... 60/753, 796, 798, 60/800

(56) References Cited

U.S. PATENT DOCUMENTS

| | | | | |
|---|---|---|---|---|
| 3,911,672 A | * 10/1975 | Irwin | .......................... | 60/753 |
| 3,922,851 A | * 12/1975 | Irwin | .......................... | 60/800 |
| 4,030,875 A | * 6/1977 | Grondahl et al. | ............. | 60/800 |
| 4,363,208 A | * 12/1982 | Hoffman et al. | .............. | 60/800 |
| 4,907,743 A | 3/1990 | Bouiller et al. | | |
| 5,457,954 A | 10/1995 | Boyd et al. | | |

FOREIGN PATENT DOCUMENTS

| | | |
|---|---|---|
| DE | 37 31 901 A1 | 4/1998 |
| GB | 1 423 052 | 1/1976 |
| GB | 1 570 875 | 7/1980 |
| JP | 2717352 | 8/1995 |
| JP | A 8-93504 | 4/1996 |

* cited by examiner

*Primary Examiner*—Michael Koczo

(57) ABSTRACT

A ceramic member support structure for a gas turbine supports ceramic members so that the ceramic members may not be easily damaged and damage to one of the ceramic members may not affect the rest of the ceramic members easily. Ceramic members (26, 27) of a gas turbine with which a combustion gas comes into contact are supported on housings (14, 14A) by metallic support members (28, 29, 41). The ceramic members (26, 27) are connected to the support members (29, 41) by elastic members (32, 42) so as to be movable relative to the support members (29, 41). The difference in thermal expansion between the ceramic members (26, 27) and the metallic support members (28, 29, 41) is absorbed by the elastic members (32, 42) and hence the ceramic members (26, 27) are not damaged easily. Since the ceramic members (26, 27) are supported by the metallic support members (28, 29, 41), damage to one of the ceramic members does not influence easily on the other ceramic member.

11 Claims, 9 Drawing Sheets

CERAMIC MEMBER SUPPORT STRUCTURE FOR GAS TURBINE

BACKGROUND OF THE INVENTION

1. Field of the Invention

The present invention relates to a ceramic member support structure for a gas turbine, for supporting ceramic members exposed to a combustion gas.

2. Description of the Related Art

Japanese Patent No. 2717352 discloses a ceramic member support structure of this kind included in a gas turbine, for supporting ceramic members, such as a ceramic scroll for guiding a combustion gas from combustors to a turbine, nozzles (stationary blades) and a turbine rotor, which are superior in heat resisting property to metal members. However, when one of the ceramic members supported by the known ceramic member support structure, such as a scroll, is damaged, the ceramic member support structure becomes incapable of properly supporting the other associated ceramic member, such as the flame tube, and the other associated ceramic member, i.e., the flame tube, is damaged. Thus, damage to one of the ceramic members supported by the ceramic member support structure is likely to affect the rest of the ceramic members.

SUMMARY OF THE INVENTION

The present invention has been made in view of the aforesaid problem and it is therefore an object of the present invention to provide a ceramic member support structure for a gas turbine, capable of supporting ceramic members so that the ceramic members may not be easily damaged and damage to one of those ceramic members is scarcely apt to affect other ceramic members.

With the foregoing object in view, a ceramic member support structure according to the present invention for a gas turbine supports a ceramic member by a metallic support member on a housing and connects the ceramic member to the support member so as to be movable relative to the support member by elastic members.

Since the ceramic member support structure for the gas turbine supports the ceramic member by the metallic support member on the housing and connects the ceramic member to the support member so as to be movable relative to the support member by the elastic members, the difference in thermal expansion between the metallic support member and the ceramic member can be absorbed by the elastic members and hence the ceramic member is not damaged easily. Since the ceramic member is supported by the metallic support member, damage to the ceramic member does not affect other ceramic members easily.

Preferably, a metal member is interposed between the adjacent ceramic members arranged along the flowing direction of a combustion gas, respectively.

Since the adjacent ceramic members are not in direct contact with each other, the influence of damage to one of the adjacent ceramic members on the other ceramic member can be suppressed to the least unavoidable extent.

Protrusions may be formed on the outer circumference of the ceramic member and recesses may be formed in the inner circumference of the metallic support member, or protrusions may be formed on the inner circumference of the metallic support member and recesses may be formed in the outer circumference of the ceramic member to combine the ceramic member and the support member in correct positional relation with respect to circumferential and radial directions.

Whereas positioning the ceramic member relative to the support member by means of metal locator pins induces a concentrated stress in the ceramic member, the combination of the protrusions and the recesses is able to position the ceramic member relative to the support member without causing stress concentration.

Preferably, most part of the outer surface of the ceramic member is covered with the support member.

The ceramic member thus covered with the support member do not strike against other members when assembling and disassembling a structure including the ceramic member, so that the possibility of damaging the ceramic member can be reduced.

The ceramic member may be a flame tube included in a combustor, the elastic member may be interposed between an upper end part of the ceramic member and a first support member, and a lower end part of the ceramic member may be pushed in the flowing direction of the combustion gas by the resilience of the elastic member so as to be pressed against a second support member.

The ceramic member, i.e., the flame tube of the combustor, is supported so that the difference in thermal expansion between the flame tube and the metal support member can be absorbed by the elastic member and hence the ceramic member is not damaged easily.

In the ceramic member support structure supporting the flame tube of the combustor, i.e., the ceramic member, an upper end part of a transition duct for carrying a combustion gas from a combustor to a gas turbine may be connected to a lower end part of the second support member by an annular sealing member so as to be movable along a combustion gas passage or in a direction perpendicular to the combustion gas passage relative to the second support member.

Thus, the difference in thermal expansion between the flame tube, i.e., the ceramic member, of the combustor and the second support member of a metal can be absorbed and the gap between a lower end part of the flame tube of the combustor and the upper end part of the transition duct can be surely sealed.

According to the present invention, the ceramic member may be a transition duct for carrying a combustion gas from a combustor to a turbine, an upper end part of the transition duct may be connected through the elastic members to a connecting part of the support member, near an upper end part of the transition duct, and a lower end part of the transition duct may be supported on the housing.

The transition duct, i.e., the ceramic member, can be supported on the housing so that the difference in thermal expansion between the transition duct and the support member of a metal can be absorbed by the elastic member. thus, the transition duct, i.e., the ceramic member, is not damaged easily.

According to the present invention, the plurality of ceramic members may be disposed around the axis of the gas turbine, and a sealing ring consisting of a plurality of segments having the shape of a circular arc may be pressed resiliently against at least the inner or the outer circumferences of the ceramic members.

This ceramic member support structure using the sealing ring consisting of the plurality of segments can be applied to a large gas turbine.

DESCRIPTION OF THE PREFERRED EMBODIMENTS

Preferred embodiments of the present invention will be described with reference to the accompanying drawings.

Figure 1:
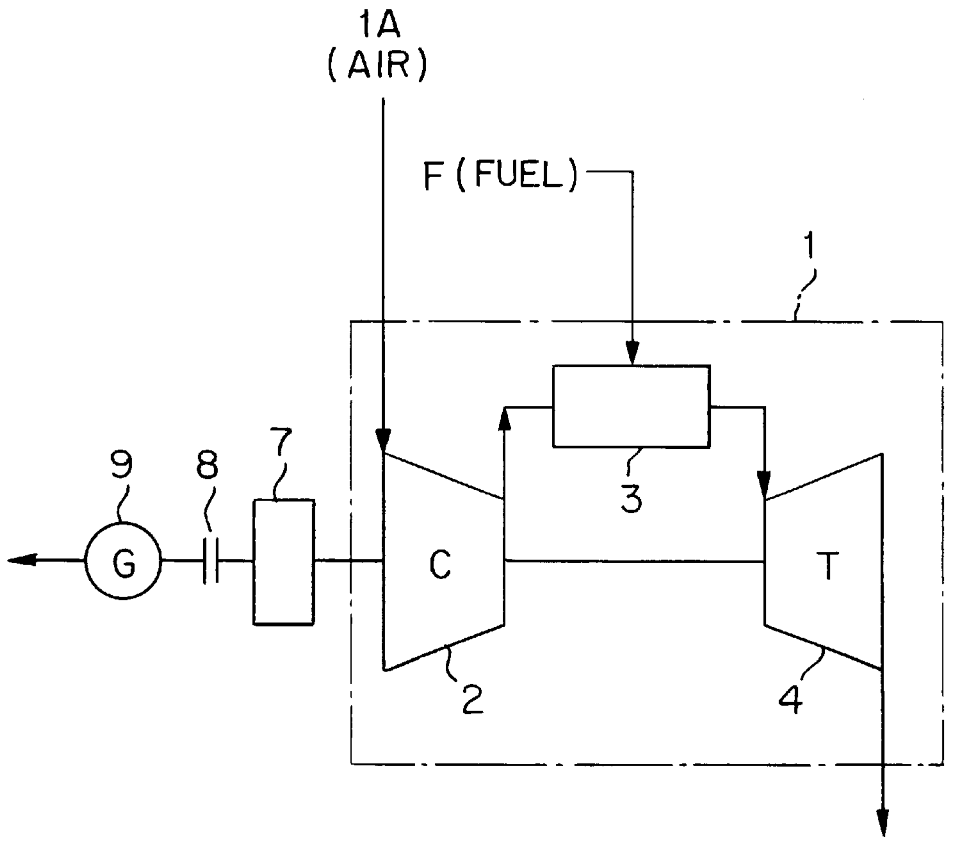
FIG. 1 is a schematic view of a gas turbine power generating system employing a gas turbine provided with a ceramic member support structure in a first embodiment according to the present invention.

Referring to FIG. 1 showing a gas turbine power generating system including a gas turbine 1 provided with a ceramic member support structure in a first embodiment according to the present invention, the gas turbine 1 compresses air IA by a compressor 2 and supplies compressed air to a plurality of combustors 3, injects fuel F, such as a gaseous fuel or a liquid fuel, into the combustors 3 for combustion and drives a turbine 4 by the energy of a high-temperature, high-pressure combustion gas produced by combustion in the combustor 3. The turbine 4 drives the compressor 2. The turbine 4 drives a power generator 9 through a reduction gear 7 and a coupling 8. Electric power generated by the power generator 9 is supplied to electrical loads.

Figure 2:
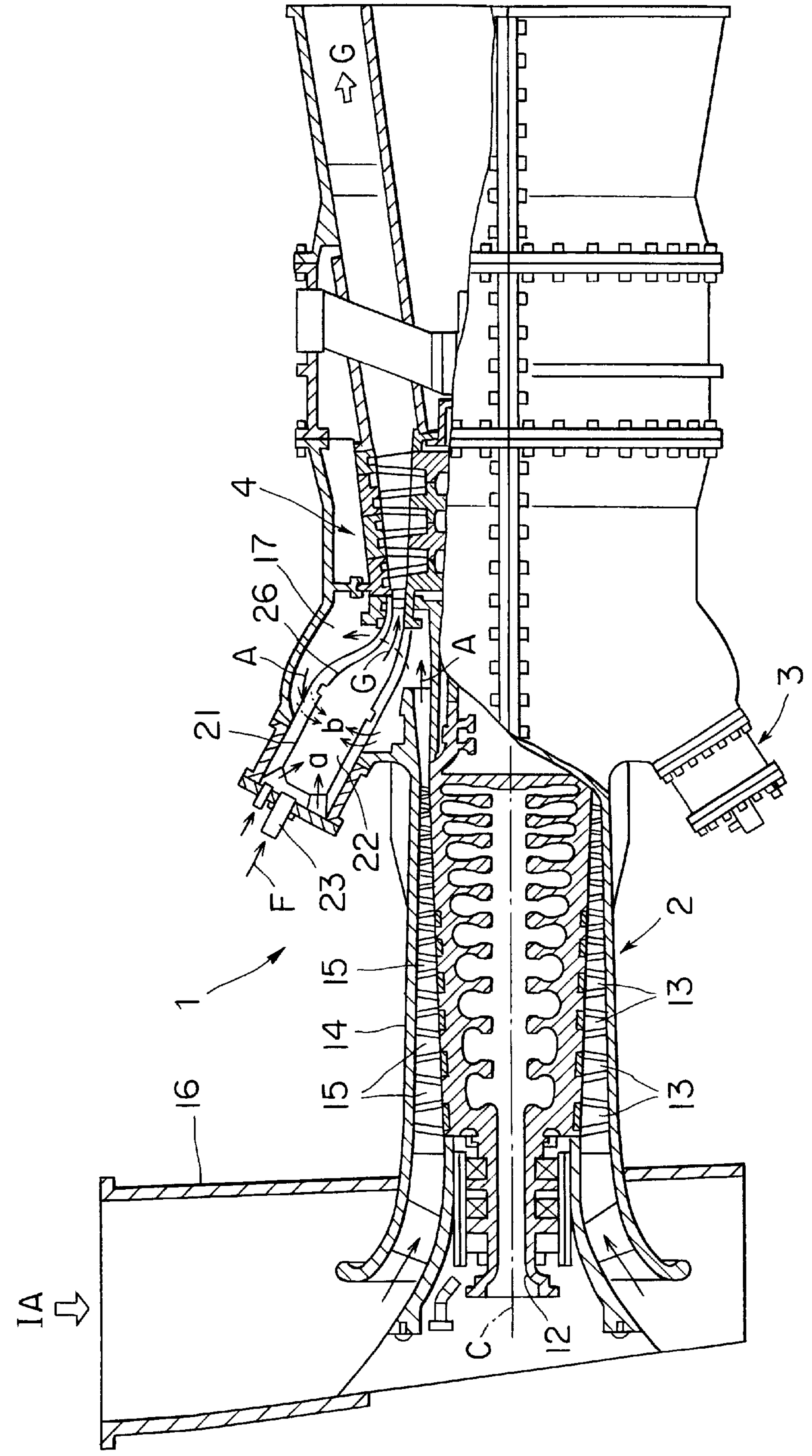
FIG. 2 is a schematic, partly cutaway side elevation of the gas turbine shown in FIG. 1.

Referring to FIG. 2 showing the gas turbine 1 in a partly cutaway side elevation, the compressor 2 of the gas turbine 1 is an axial compressor. The axial compressor 2 has a rotor shaft 12, a plurality of rotor blades 13 arranged on the outer circumference of the rotor shaft 12, and stationary blades 15 arranged in a plurality of stages on the inner circumference of a main housing 14 of a metal, i.e., a principal part of the housing of the gas turbine 1. Air IA supplied through an intake duct 16 is compressed by the cooperative action of the rotor blades 13 and the stationary blades 15 to produce compressed air A. the compressed air A is supplied into an annular chamber 17.

The plurality of combustors 3, for example, six combustors, are arranged at equal angular intervals around the annular chamber 17. The compressed air A supplied into the annular chamber 17 flows in the directions of the arrows a and b into a combustion chamber 22 defined by a cylindrical flame tube 21. Each combustor 3 is provided with a fuel injection nozzle 23. The fuel injection nozzle 23 injects the fuel F into the combustion chamber 22. The fuel F is mixed with the compressed air A and burns. A high-temperature, high-pressure combustion gas G produced by the combustion of the fuel F is carried by a transition duct 26 into the turbine 4.

Figure 3:
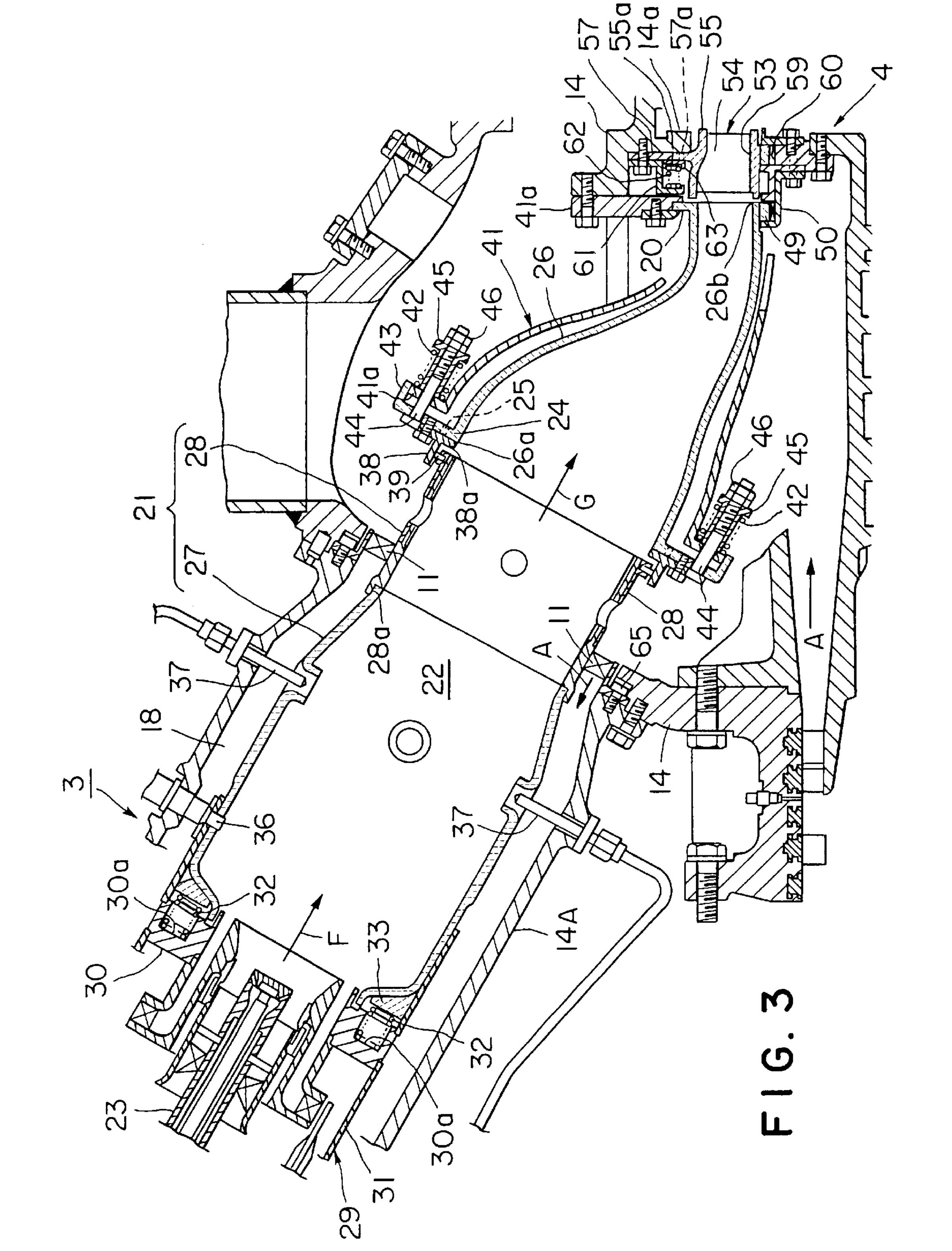
FIG. 3 is a longitudinal sectional view of an essential part of a combustor shown in FIG. 2.

Referring to FIG. 3, showing an essential part of one of the combustors 3 in an enlarged longitudinal sectional view, the flame tube 21 is inserted in a combustor housing 14A of a metal connected to and forming a part of the main housing 14. An annular space 18 is formed between the combustor housing 14A and the flame tube 21.

The flame tube 21 includes an upper half tube 27 of a ceramic material and a lower half tube 28 of a metal. A lower end part of the upper half tube 27 is fitted in an upper end part 28*a* of the lower half tube 28. An upper end part of the upper half tube 27 is supported on the combustor housing 14A by a first support member 29 of a metal. The first support member 29 is provided with a spring holder 30 coaxial with and surrounding the fuel injection nozzle 23. A tubular member 31 welded to the spring holder 30 has a base end part fastened to the combustor housing 14A. A plurality of coil springs 32, i.e., elastic members, and a support ring 33 of a ceramic material are interposed between the spring holder 30 of the first support member 29 and an upper end part of the upper half tube 27. A plurality of recesses 30*a* are formed in the spring holder 30 at equal angular intervals to hold the coil springs therein. The coil springs 32 held in the recesses 30*a* exert resilient force through the support ring 33 to the upper end part of the upper half tube 27 to press the lower end part of the upper half tube 27 against the upper end part of the lower half tube 28 in the flowing direction of the combustion gas G.

An ignition plug 36 held on the combustor housing 14A is inserted in an upper region of a space in the upper half tube 27. A plurality of auxiliary nozzles 37 held on the combustor housing 14A are inserted in a lower region of the space in the upper half tube 27.

The lower half tube 28 of a metal is a double-wall structure having two walls defining a heat insulating space. The lower half tube 28 serves also as a second support member for supporting a lower end part of the upper half tube 27. The inner circumference of the lower half tube 28 is fixed to a plurality of guide blades 11 fastened to the combustor housing 14A with bolts 65. The lower half tube 28 is held on the combustor housing 14A. An annular sealing member 39 is put on a lower end part of the lower half tube 28. The sealing member 39 is in close contact with the inner circumference of a seal support 38 formed on an upper end part 26*a* of the transition duct 26. Thus the gap between the lower half tube 28 and the transition duct 26 is sealed by the sealing member 39 so as to allow the transition duct 26 and the lower half tube 28 to move relative to each other in directions parallel or perpendicular to the passage for the combustion gas G.

The transition duct 26 is formed of a ceramic material. The upper end part 26*a* of the transition duct 26 is supported on the main housing 14 by a third support member 41 of a metal. The third support member of a metal has a base part 41*b* fastened to the main housing 14 with bolts. The support member 41 is a tubular member covering most part of the outer surface of the transition duct 26. Thus the transition duct 26, i.e., a ceramic member, is prevented from striking against other parts and protected from being damaged when assembling or disassembling the combustor 3. The upper end part 26*a* of the transition duct 26 is connected through coil springs 42, i.e., elastic members, and a metal ring 43 to a flange-shaped joining part 41*a* of the support member 41, adjacent to the upper end of the transition duct 26. The metal ring 43 is a part of the support member 41.

A plurality of bolts 44 each provided with a head are passed through holes formed at angular intervals in the joining part 41*a* of the support member 41 so as to be movable in directions parallel to the passage for the combustion gas G. The heads of the bolts 44 are engaged with the metal rings 43. Coil springs 42 and spring bearings 45 are put in that order on the bolts 44, and nuts are screwed on the bolts 44 to retain the spring bearings 45 on the bolts 44, respectively. A base part 38*a* of the seal support 38 is fastened to the metal ring 43 with bolts to support the upper end part 26*a* of the transition duct 26. As shown in FIG. 4, a plurality of protrusions 24 are formed at angular intervals on the outer circumference of the upper end part 26*a* of the transition duct 26, and a plurality of recesses 25 are formed at angular intervals in the inner circumference of the metal ring 43. The protrusions 24 engages in the recesses 25 to position the transition duct 26 relative to the support member 41 with respect to circumferential and radial directions for centering.

When the transition duct 26 is thus positioned relative to the support member 41 instead of positioning the transition duct 26 of a ceramic material by locating pins, any stress is not concentrated in local portions of the transition duct 26.

A plurality of protrusions may be formed at angular intervals on the inner circumference of the metal ring 43 and a plurality of recesses may be formed at angular intervals in the outer circumference of the upper end part 26*a* of the transition duct 26. This support structure supports the upper end part 26*a* of the transition duct 26 on the support member 41 pressing the upper end part 26*a* against the support member 41 by the resilience of the coil springs 42.

Figures 4A, 4B, 4C, 4D, 4E, 4F:
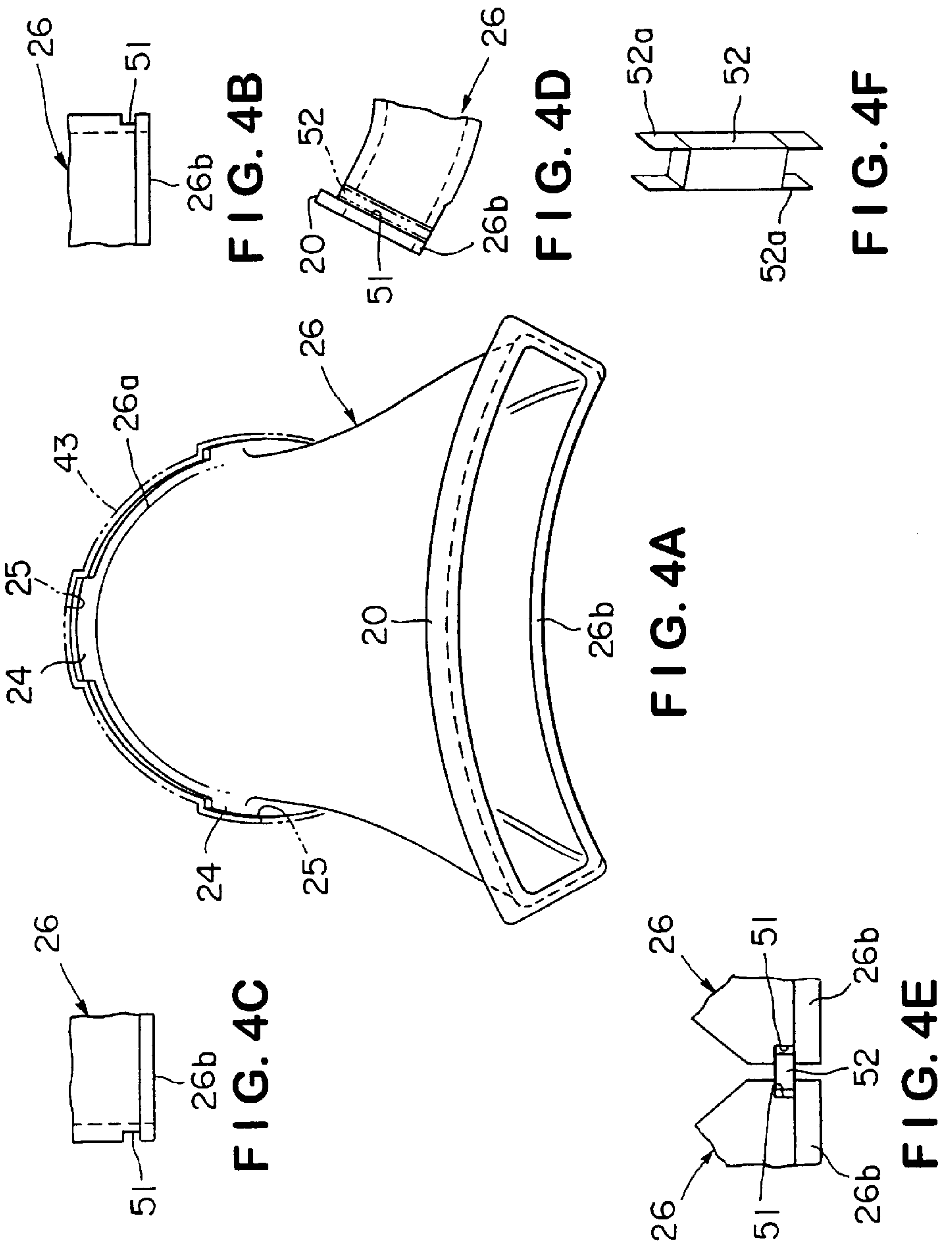
FIG. 4(A) is a back view of a transition duct shown in FIG. 2.
FIG. 4(B) is a plan view of a portion of a lower end part of the transition duct shown in FIG. 4(A)
FIG. 4(C) is a plan view of another portion of the lower end part of the transition duct shown in FIG. 4(A)
FIG. 4(D) is a plan view of an essential part of a sealing structure for sealing the gap between lower end parts of adjacent transition ducts.
FIG. 4(E) is a perspective view of a sealing plate.
FIG. 4(F) is a fragmentary end view of parts of adjacent transition ducts around the joint of the adjacent transition ducts.
Figure 5B:
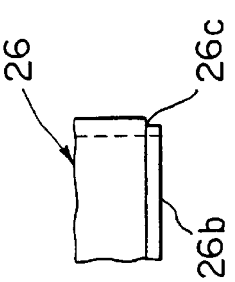
FIG. 5(B) is a plan view of a portion of a lower end part of the transition duct shown in FIG. 5(A)
Figure 5D:
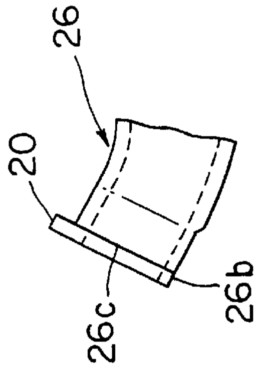
FIG. 5(D) is a plan view of an essential part of a sealing structure for sealing a gap between lower end parts of adjacent transition ducts.
Figure 5A:
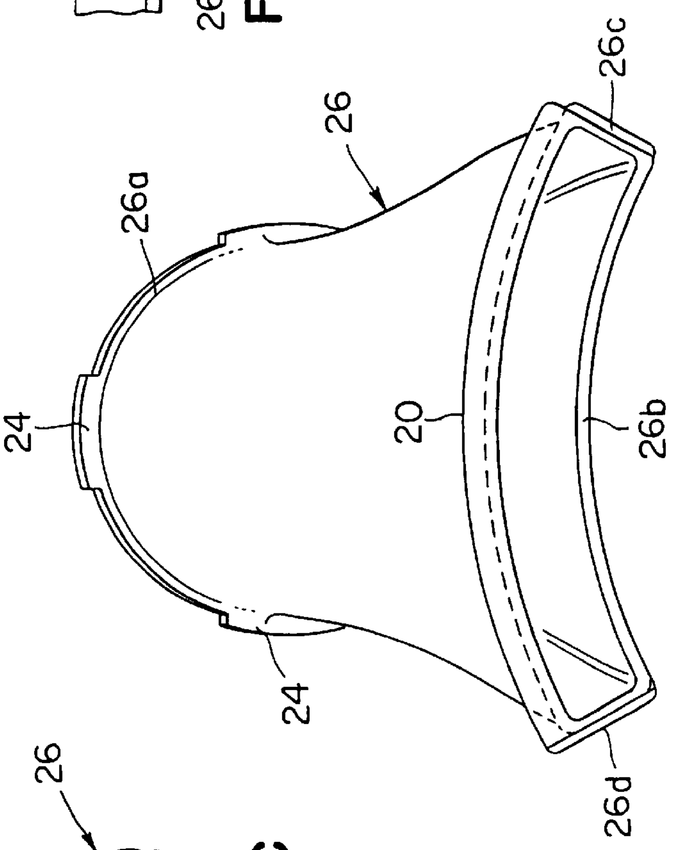
FIG. 5(A) is a back view of another transition duct for the gas turbine shown in FIG. 2.
Figure 5C:
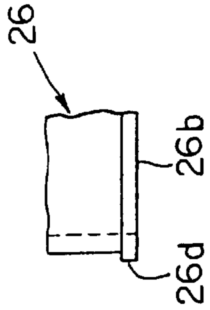
FIG. 5(C) is a plan view of another portion of the lower end part of the transition duct.
Figure 5E:
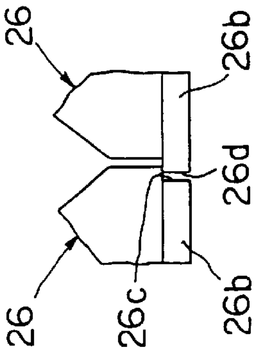
FIG. 5(E) is a fragmentary end view of parts of adjacent transition ducts around the joint of the adjacent transition duct.

A lower end part 26*b* of each transition duct 26 faces the upper end of a first-stage nozzle (first-stage stationary blade) 53 of the turbine 4. As shown in FIG. 4(A), the lower end part 26*b* is formed in a circular shape so as to corresponds to a circumferential part of the nozzle 53. This gas turbine 1 is provided with the six combustors 3. Therefore the lower end part 26*b* of the transition duct 26 corresponds substantially to ⅙ of the circumference of the stationary nozzle 53. A flange 20 is formed on the lower end part 26*b* of the transition duct 26 and is supported on the joining part 41*a* of the support member 41.

Figure 6:
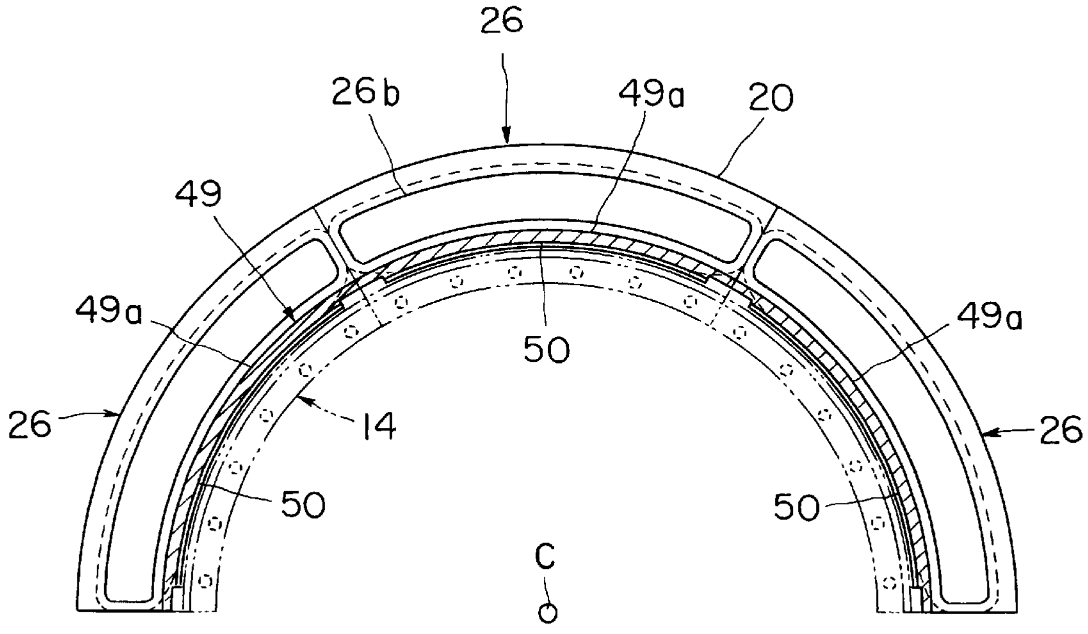
FIG. 6 is a back view of a support structure for supporting a lower end part of the transition duct shown in FIG. 2.

The lower end part 26*b* of the transition duct 26 is connected through a sealing ring 49 and a spring 50 to the main housing 14. The sealing ring 49, as represented in a shaded region in FIG. 6, includes a plurality of segments 49*a* of a ceramic material having the shape of a circular arc. The segments 49*a* are arranged in a circle around the axis C of the gas turbine 1. The spring 50 has a diameter not equal to that of the inner circumference of the sealing ring 49 and includes a plurality of segments of a ceramic material having the shape of a circular arc. The sealing ring 49 is pressed against the lower end part 26*b* of the transition duct 26 by the resilience of the spring 50. Thus, the inner circumferences of the lower end parts 26*b* of the plurality of transition ducts 26 are sealed by the sealing ring 49 including the plurality of segments 49*a*. This arrangement is applicable to large gas turbines.

As shown in FIGS. 4(B) and 4(C) in fragmentary plan views, sealing grooves 51 are formed in the opposite side surfaces of the lower end part 26*b* of each transition duct 26 to seal gaps between the side surfaces of the circumferentially adjacent transition ducts 26. A sealing plate 52 shown in FIG. 4(E) is fitted in the sealing groove 51 as indicated by chain lines in FIG. 4(D) so that the sealing plate 52 is compressed between the respective side surfaces of the lower end parts 26*b* of the adjacent transition duct 26 as shown in FIG. 4(F) to seal the gap between the lower end parts 26*b* of the adjacent transition duct 26. After fitting the sealing plate 52 in the sealing grooves 51, lugs 52*a* formed on the upper and the lower end of the sealing plate 52 are bent outward to retain the sealing plate 52 in the sealing grooves 51.

The sealing structure for sealing the gaps between the side surfaces of the lower end parts 26*b* of the adjacent transition ducts 26 may be a labyrinth sealing structure as shown in FIG. 5. The labyrinth sealing structure is constructed by forming a recess 26*c* in one of the opposite side surface of the lower end part 26*b* of the transition duct 26 as shown in FIG. 5(B) in a fragmentary plan view, forming a protrusion 26*d* on the other side surface of the lower end part 26*b* of the transition duct 26 as shown in FIG. 5(C) in a fragmentary plan view, and engaging the recess 26*c* and the protrusion 26*d* of the lower end parts 26*b* of the adjacent transition ducts 26 as shown in FIG. 5(E).

Figure 7:
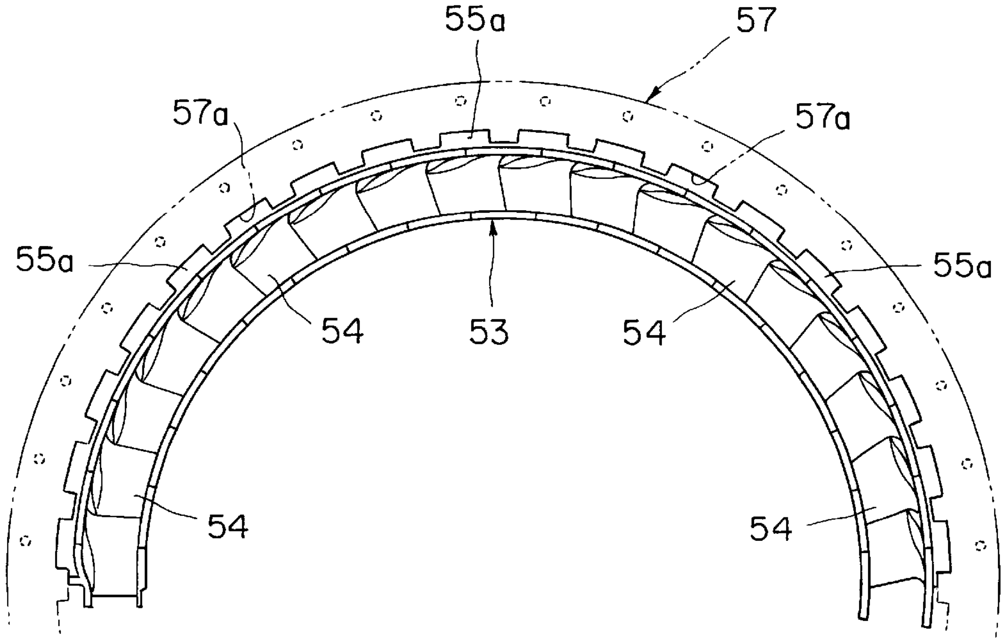
FIG. 7 is a front elevation of a nozzle for the turbine shown in FIG. 2.

The first-stage nozzle 53 of the turbine 4 is made of a ceramic material. The nozzle 53 includes a plurality of nozzle segments 54 arranged on a circle. A protrusion 55*a* is formed on the outer end surface 55 of each nozzle segment 54. A metal ring 57 is fixed to the main housing 14 (FIG. 3) so as to surround the nozzle 53. The ring 57 is provided in its inner circumference with a plurality of recesses 57*a*. The protrusions 55*a* of the nozzle segments 54 engage in the recesses 57*a* of the metal ring 57, respectively, as shown in FIG. 7 to locate the nozzle segments 54 with respect to a circumferential direction. The nozzle segments 54 are able to move in the flowing direction of the combustion gas G indicated by the arrow in FIG. 3. The lower end surfaces of the protrusions 55*a* of the nozzle segments 54 are seated on a support part 14*a* of the main housing 14.

The inner circumference of the first-stage nozzle 53, similarly to the inner surface of the lower end part 26*b* of the transition duct 26, is supported through a sealing ring 59 and a spring 60 on the main housing 14. The sealing ring 59 is divided into a plurality of segments of a ceramic material. The spring 60 has a diameter not equal to that of the inner circumference of the sealing ring 59 and includes a plurality of segments of a ceramic material having the shape of a circular arc. The sealing ring 59 is pressed against the inner circumference of the first-stage nozzle 53 by the resilience of the spring 60. Thus, the inner circumference of the first-stage nozzle 53 including the plurality of nozzle segments 54 of a ceramic material by the sealing ring 59. This arrangement is applicable to large gas turbines. The sealing ring 59 determines the position of the first-stage nozzle 53 with respect to diametrical directions and is capable of adjusting the position of the first-stage nozzle 53 for centering according to the thermal expansion of the associated metal members.

A spring holding ring 61 surrounds the first-stage nozzle 53. The spring holding ring 61 is fastened together with the first-stage nozzle 53 to the main housing 14 with bolts. A plurality of coil springs 62, i.e., elastic members, are held in a circumferential arrangement by the spring holding ring 61. The resilience of the coil springs 62 is exerted axially through a spring bearing 63 on the upper surfaces of the protrusions 55*a* of the nozzle segments 54. A nozzle support structure for the nozzle 53 thus formed absorbs the difference in thermal expansion between the first-stage nozzle 53, i.e., a ceramic member, and the metal ring 57 by the coil springs 62, i.e., elastic members, so that the nozzle 53 is not damaged easily.

In this embodiment, the upper half tube 27, i.e., a ceramic member, of the flame tube 21 of the combustor 3 shown in FIG. 3 is supported on the combustor housing 14A by the support member 29, i.e., a metal member, and is connected to the transition duct 26 by the lower half tube 28, i.e., a metal member, the influence of damage to the upper half tube 27 on the transition duct 26, i.e., a ceramic member, can be prevented. Since the upper half tube 27 is connected through the coil springs 32 to the support member 29 so as to be movable in the flowing direction of the combustion gas G, the difference in thermal expansion between the support member 29 of a metal and the upper half tube 27 of a ceramic material can be absorbed by the coils springs 32, i.e., elastic members, so that the breakage of the upper half tube 27 due to the difference in thermal expansion between the support member 29 and the upper half tube 27 can be prevented.

The transition duct 26, i.e., a ceramic member, connected to the lower end of the flame tube 21 is supported through the support member 41 of a metal and the metal ring 43 on the main housing 14. Therefore, the influence of damage to the transition duct 26 on the upper half tube 27, i.e., a ceramic member, can be prevented. Since the transition duct 26 is connected through the coil springs 42 to the support member 41 so as to be movable in the flowing direction of the combustion gas G, the difference in thermal expansion between the support member 41, i.e., a metal member, and the transition duct 26, i.e., a ceramic member, can be absorbed by the coil springs 42, so that the breakage of the transition duct 26 due to the difference in thermal expansion between the support member 41 and the transition duct 26 can be prevented.

Since most part f the outer surface of the transition duct 26, i.e., a ceramic member, is covered with the support member 41, the transition duct 26, is prevented from striking against other parts and protected from being damaging when assembling or disassembling the combustor 3.

Figure 8:
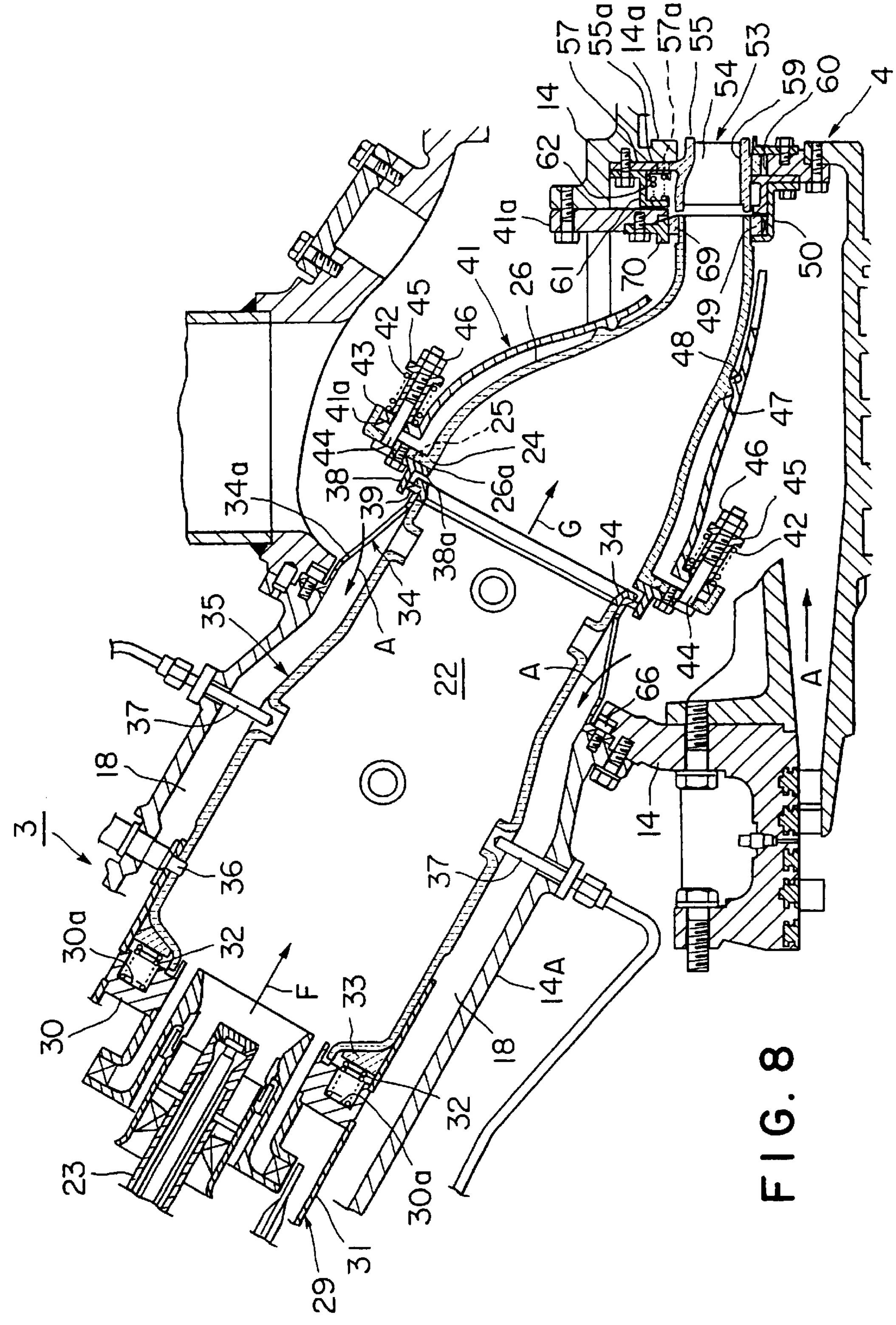
FIG. 8 is an enlarged longitudinal sectional view of essential part of a gas turbine employing a ceramic member support structure in a second embodiment according to the present invention.

Referring to FIG. 8 a combustor 3 employing a support structure in a second embodiment according to the present invention has a flame tube 35 formed of a ceramic material in a single piece, and a transition duct 26 of a ceramic material connected to the lower end of the flame tube 35. An upper end part of the flame tube 35 is supported on a combustor housing 14A by a first support member 29 of a metal with a plurality of coil springs 32, i.e., elastic members, interposed between the first support member 29 and the flame tube 35.

A lower end part of the flame tube 35 is supported on the combustor housing 14A by a second support member 34 of a metal. The second support member 34 is a cylindrical member covering the lower end part of the flame tube 35. The second support member 34 has a lower end part closely put on the lower end part of the flame tube 35 and a base part fastened to the combustor housing 14A with bolts 66. The support member 34 is provided with a plurality of openings 34*a*. An annular sealing member 39 is put on the lower end part of the support member 34. The sealing member 39 is in close contact with the inner circumference of a seal support 38 formed on an upper end part 26*a* of the transition duct 26. Thus the gap between the support member 34 and the transition duct 26 is sealed by the sealing member 39 so as to allow the transition duct 26 and the support member 34 to move relative to each other in directions parallel or perpendicular to the passage for the combustion gas G.

An upper end part of the transition duct 26 is supported on the housing 14 by a third support member 41 by a method similar to that employed in the first embodiment. The upper end part 26*a* of the transition duct 26, is joined, similarly to the upper end part 26*a* of the transition duct 26 in the first embodiment, through coil springs 42, bolts 44 and a metal ring 43 to an upper end part of the support member 41. The transition duct 26 is provided on its outer circumference with a circular ridge 47 and the support member 41 is provided in its inner circumference with a circular groove 47. The circular ridge 47 is in engagement with the circular groove 48 to restrain the axial movement of the transition duct 26 relative to the support member 41.

Figure 9:
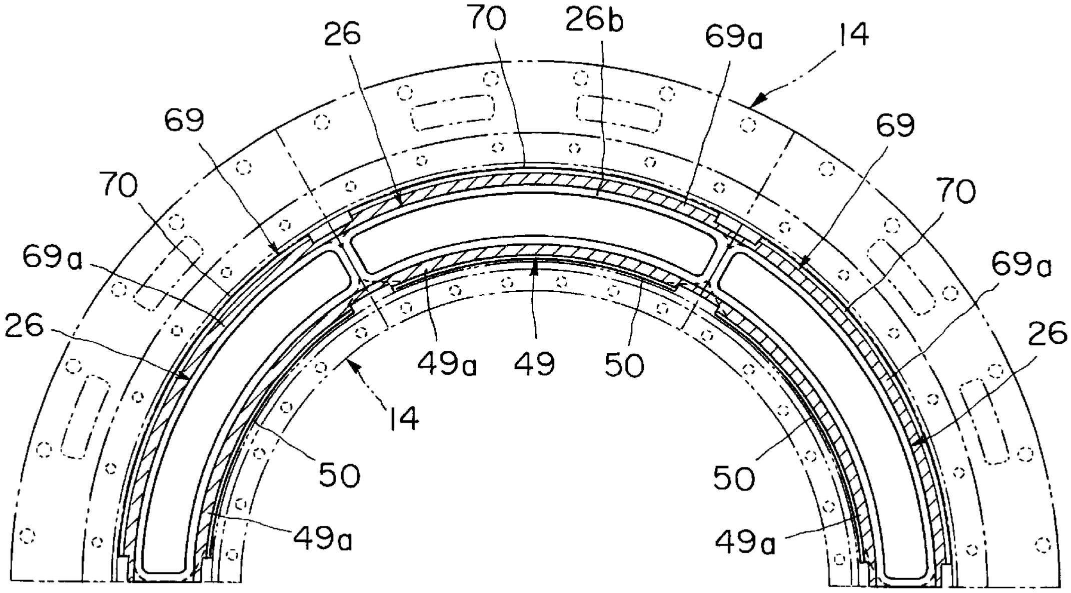
FIG. 9 is a back view of a support structure for supporting a lower end part of the transition duct shown in FIG. 8.

As shown in FIG. 9, a lower end part 26*b* of the transition duct 26 is connected through a sealing ring 69 and a spring 70 to the main housing 14. A support structure thus supporting the lower end part 26*b* of the transition duct 26 is similar to that in the first embodiment. The second embodiment is similar in other respects to the first embodiment.

As apparent from the foregoing description, the ceramic member support structure according to the present invention for a gas turbine supports the ceramic member by the metal member on the housing and hence the ceramic member is not damaged easily. Since the ceramic member is connected to the support member by the elastic members so that the ceramic member and the support member are able to move relative to each other, the difference in thermal expansion between the metal support member and the ceramic member can be absorbed by the elastic members.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A ceramic member support structure for supporting at least one ceramic member included in a gas turbine, with which a combustion gas comes into contact, comprising:

a metallic support member interposed between the at least one ceramic member and a housing included in the gas turbine to support the at least one ceramic member on the housing; and elastic members connecting the at least one ceramic member to the metallic support member so as to be movable relative to the metallic support member;

wherein the at least one ceramic member comprises a plurality of ceramic members disposed around an axis of the gas turbine, and a sealing ring consisting of a plurality of segments having the shape of a circular arc are pressed resiliently against at least the inner or the outer circumferences of the ceramic members.

2. The ceramic member support structure according to claim 1, wherein ceramic members are arranged along a flowing direction of the combustion gas and a metal member is interposed between the ceramic members.

3. The ceramic member support structure according to claim 1, wherein the at least one ceramic member has an outer circumference and the metal support member has an inner circumference, and protrusions are formed on an outer circumference of the ceramic member and recesses are formed in an inner circumference of the metal support member, or protrusions are formed on an inner circumference of the metal support member and recesses are formed in an outer circumference of the ceramic member to combine the ceramic member and the metallic support member in correct positional relation with respect to circumferential and radial directions.

4. The ceramic member support structure according to claim 1, wherein the at least one ceramic member has an outer surface and most part of the outer surface of the ceramic member is covered with the metallic support member.

5. The ceramic member support structure according to claim 1, wherein the metallic support member includes a first support member and a second support member, the at least one ceramic member is a flame tube having an upper end part and a lower end part included in a combustor, the elastic members are interposed between an upper end part of the combustor and the first support member, and a lower end part of the combustor is pushed in the flowing direction of the combustion gas by the resilience of the elastic member so as to be pressed against the second support member.

6. The ceramic member support structure according to claim 5, wherein a transition duct for carrying a combustion gas from the combustor to a gas turbine has an upper end part and the second support member has a lower end part and the upper end point of the transition duct is put on the lower end part of the second support member with an annular sealing member interposed between the upper end part of the transition duct and the lower end part of the second support member so as to be movable along a combustion gas passage or in directions perpendicular to the combustion gas passage relative to the second support member.

7. A ceramic member support structure according to claim 1, wherein the at least one ceramic member is a transition duct having an upper end part and a lower end part and the support member has a connecting part and the transition duct is for carrying a combustion gas from a combustor to a turbine, an upper end part of the transition duct is connected through the elastic members to the connecting part of the support member, near the upper end part of the transition duct, and a lower end part of the transition duct is supported on the housing.

8. A ceramic member support structure according to claim 2, wherein the at least one ceramic member is a transition duct having an upper end part and a lower end part for carrying a combustion gas from a combustor to a turbine, an upper end part of the transition duct is connected through the elastic members to a connecting part of the support member, near the upper end part of the transition duct, and a lower end part of the transition duct is supported on the housing.

9. A ceramic member support structure according to claim 3, wherein the ceramic member is a transition duct having an upper end part and a lower end part for carrying a combustion gas from a combustor to a turbine, an upper end part of the transition duct is connected through the elastic members to a connecting part of the support member, near the upper end part of the transition duct, and a lower end part of the transition duct is supported on the housing.

10. The ceramic part support structure according to claim 2, wherein the plurality of ceramic members are disposed around an axis of the gas turbine, and a sealing ring consisting of a plurality of segments having the shape of a circular arc are pressed resiliently against at least the inner or the outer circumferences of the ceramic members.

11. A ceramic member support structure for supporting at least one ceramic member for including in a gas turbine, with which a combustion gas is designed to come in contact, comprising:

a metallic support member adapted to be interposed between the at least one ceramic member having an inner circumference and an outer circumference and a housing included in the gas turbine to support the at least one ceramic member on the housing; and elastic members adapted to connect the ceramic member to the metallic support member so as to be movable relative to the metallic support member;

wherein a plurality of ceramic members are adapted to be disposed around an axis of the gas turbine, and a sealing ring of a plurality of segments having the shape of a circular arc is adapted to be pressed resiliently against at least the inner or outer circumferences of the ceramic members.

* * * * *